US 6,726,359 B2

United States Patent
Lüthi

(10) Patent No.: US 6,726,359 B2
(45) Date of Patent: Apr. 27, 2004

(54) APPARATUS AND METHOD OF DETECTING THE ROOM TEMPERATURE BY MEANS OF SOUND WAVES

(75) Inventor: Yves Lüthi, Cham (CH)

(73) Assignee: Siemens Building Technologies AG (CH)

( * ) Notice: Subject to any disclaimer, the term of this patent is extended or adjusted under 35 U.S.C. 154(b) by 0 days.

(21) Appl. No.: 09/957,769

(22) Filed: Sep. 21, 2001

(65) Prior Publication Data

US 2002/0101905 A1 Aug. 1, 2002

(30) Foreign Application Priority Data

Nov. 6, 2000 (EP) .............................................. 00124055

(51) Int. Cl.$^7$ .............................................. G01K 11/22
(52) U.S. Cl. ........................................ 374/119; 374/117
(58) Field of Search .............................. 374/117, 118, 374/119; 73/597, 629, 632

(56) References Cited

U.S. PATENT DOCUMENTS

| | | | |
|---|---|---|---|
| 4,031,756 A | | 6/1977 | Rotier et al. |
| 4,112,756 A | * | 9/1978 | MacLennan et al. .......... 73/597 |
| 4,162,473 A | * | 7/1979 | Utasi ........................... 340/1 L |
| 4,623,264 A | * | 11/1986 | Mitchell ..................... 374/117 |
| 4,630,482 A | * | 12/1986 | Traina .......................... 73/597 |
| 4,655,992 A | * | 4/1987 | McKnight et al. .......... 374/119 |
| 4,676,665 A | * | 6/1987 | Twerdochlib ............... 374/117 |
| 4,762,001 A | * | 8/1988 | Wuttke ......................... 73/597 |
| 4,810,100 A | * | 3/1989 | Shavit et al. ............... 374/117 |
| 4,972,178 A | * | 11/1990 | Suzuki ........................ 374/119 |
| 5,052,227 A | * | 10/1991 | LeFloc'H et al. ............. 73/597 |
| 5,163,323 A | * | 11/1992 | Davidson ...................... 73/597 |
| 5,349,859 A | | 9/1994 | Kleppe |
| 5,360,268 A | * | 11/1994 | Hayashi et al. ............. 374/117 |
| 5,437,506 A | * | 8/1995 | Gray .......................... 374/119 |
| 5,624,188 A | * | 4/1997 | West ........................... 374/119 |
| 5,987,994 A | * | 11/1999 | Maltby et al. ................. 73/597 |
| 6,386,755 B1 | * | 5/2002 | Draxton et al. ............. 374/117 |
| 2002/0105999 A1 | * | 8/2002 | Wallen et al. .............. 374/117 |

FOREIGN PATENT DOCUMENTS

| | | | |
|---|---|---|---|
| DE | 1 943 846 | 3/1970 | |
| EP | 198732 A1 | * 10/1986 | .................. 374/117 |
| EP | 1 014 061 | 6/2000 | |
| JP | 58097633 A | * 6/1983 | .................. 374/119 |
| JP | 59.226842 | 12/1984 | |
| JP | 60098324 A | * 6/1985 | .................. 374/117 |
| JP | 60131436 A | * 7/1985 | .................. 374/117 |
| JP | 01132921 A | * 5/1989 | .................. 374/117 |
| JP | 02147928 A | * 6/1990 | .................. 374/117 |
| WO | WO-93/00577 A1 | * 1/1993 | .................. 374/117 |

OTHER PUBLICATIONS

A.L. Virovlyanskii, A.Y. Kazarova, L.Y. Lyubavin, "Reconstruction of the Mean Temperature in a Water Layer from the Arrival Times of Quartets of Rays: Accuracy Estimations", Acoustical–Physics, vol. 44, No. 1, 1998, pp. 29–34.

* cited by examiner

Primary Examiner—Diego Gutierrez
Assistant Examiner—Mirellys Jagan
(74) Attorney, Agent, or Firm—Greer, Burns & Crain, Ltd.

(57) ABSTRACT

An apparatus for detecting the temperature of a room (2) includes means (4) for generating and receiving sound waves, means (5) for determining the transit time of the sound waves for a certain distance (x) in the room (2) and means (10) for calculating the temperature (U) of the room (2) by means of the ascertained transit time (t) of the sound waves for the distance (x) in the room (2). An approximation procedure for ascertaining the distance (x) is automatically executed. The temperature (U) ascertained in that way corresponds to a mean room temperature over the distance (x).

4 Claims, 3 Drawing Sheets

APPARATUS AND METHOD OF DETECTING THE ROOM TEMPERATURE BY MEANS OF SOUND WAVES

BACKGROUND OF THE INVENTION

1. Field of the Invention

The invention relates to an apparatus and a method for detecting the temperature of a room.

Such apparatuses and methods are advantageously used in buildings for detecting an average temperature in a room.

2. Description of the Prior Art

An apparatus for detecting temperature by means of sound waves is known (U.S. Pat. No. 5,349,859), in which the speed of sound in a fluid is detected and the temperature of the fluid is calculated therefrom.

It is also known (U.S. Pat. No. 4,031,756) to use ultrasonic waves to detect the flow speed of air and to calculate the temperature of the air.

In the known apparatuses and methods of detecting temperature by means of sound waves or ultrasonic waves, it is presupposed that the distance which the sound waves or ultrasonic waves cover in the measuring apparatus is precisely known.

The expressions sound or sound wave without further details denote generally hereinafter sound waves in the frequency ranges of audible sound (16 Hz$\leq$f$\leq$16 kHz) or ultrasound (f>16 kHz).

SUMMARY OF THE INVENTION

The object of the invention is to provide an apparatus and a method of detecting the temperature of a room by means of sound waves, which can also be used when the dimensions of the room are not known.

According to a first aspect of the present invention, there is provided apparatus for detecting the temperature of a room including:

means for generating and receiving sound waves, means for determining the transit time of the sound waves for a certain distance in the room, means for calculating the temperature of the room by means of the ascertained transit time of the sound waves for the distance in the room, and means for automatically carrying out an approximation procedure for ascertaining the distance.

According to a second aspect of the present invention, there is provided a method of detecting the temperature of a room by means of sound waves including the method steps of:

emitting sound waves towards a delimiting surface of the room, which reflects sound waves;

receiving reflected sound waves;

calibrating a value for the spacing at which the delimiting surface is from the transmitting or receiving device for the sound waves; and calculating the temperature of the room using the spacing and the transit time of the sound waves for the spacing.

According to a third aspect of the present invention, there is provided an installation for regulating and/or controlling room climate parameters, including an apparatus in accordance with the first aspect of the invention.

Advantageous features are set forth in the dependent claims.

BRIEF DESCRIPTION OF THE DRAWINGS

Embodiments of the invention are described in greater detail hereinafter with reference to the drawings in which.

DESCRIPTION OF THE PREFERRED EMBODIMENTS

Figure 1:
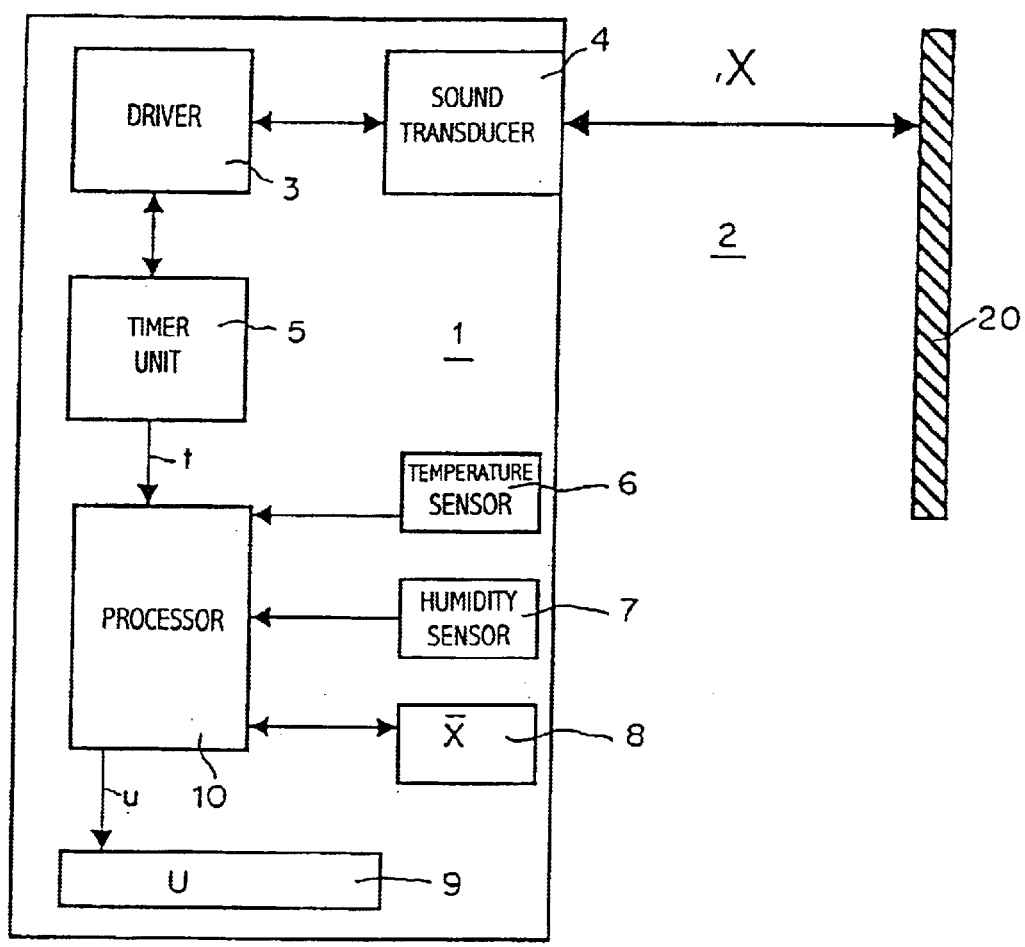
FIG. 1 shows an apparatus for detecting the temperature of a room by means of sound waves which are reflected at a certain spacing x.

Referring to FIG. 1 reference 1 denotes an apparatus for detecting the temperature of a room 2. The apparatus 1 has a sound transducer 4 which is actuatable by way of driver unit 3 and a timer unit 5. A temperature sensor 6 and a humidity sensor 7 are advantageously arranged in the apparatus 1. The apparatus 1 also includes a first memory location 8 for a variable x and a second memory location 9 for a further variable U. The apparatus 1 advantageously has at least one processor 10.

The temperature sensor 6 is advantageously an inexpensive device, for example a nickel sensor.

At a certain spacing x from the sound transducer 4 the room 2 is delimited by an obstacle 20 which reflects sound waves. The obstacle 20 is for example a wall, a pillar, an article of furniture or a reflector.

Sound waves generated by the sound transducer 4 pass through the room 2 over the spacing x and encounter the obstacle 20 which at least partially reflects the sound waves so that the reflected sound waves go back to the sound transducer 4 over the spacing x and can be converted into electrical signals in the sound transducer 4.

The driver unit 3 serves for operation of the sound transducer 4 and supplies on the one hand electrical signals for actuation of the sound transducer 4. On the other hand the electrical signals generated by the sound transducer 4, adapted by the driver unit 3 to the requirements of the timer unit 5, are forwarded to the latter.

Actuation of the sound transducer 4 and evaluation of the electrical signals generated by the sound transducer 4 are matched in respect of time to each other and implemented in such a way by the timer unit 5 that it is possible to ascertain the transit time t that the sound waves require to cover the spacing x.

If necessary the timer unit 5 includes an additional processor or microcomputer or the timer unit 5 and the processor 10 are embodied in the form of a highly integrated single component.

Figure 2:
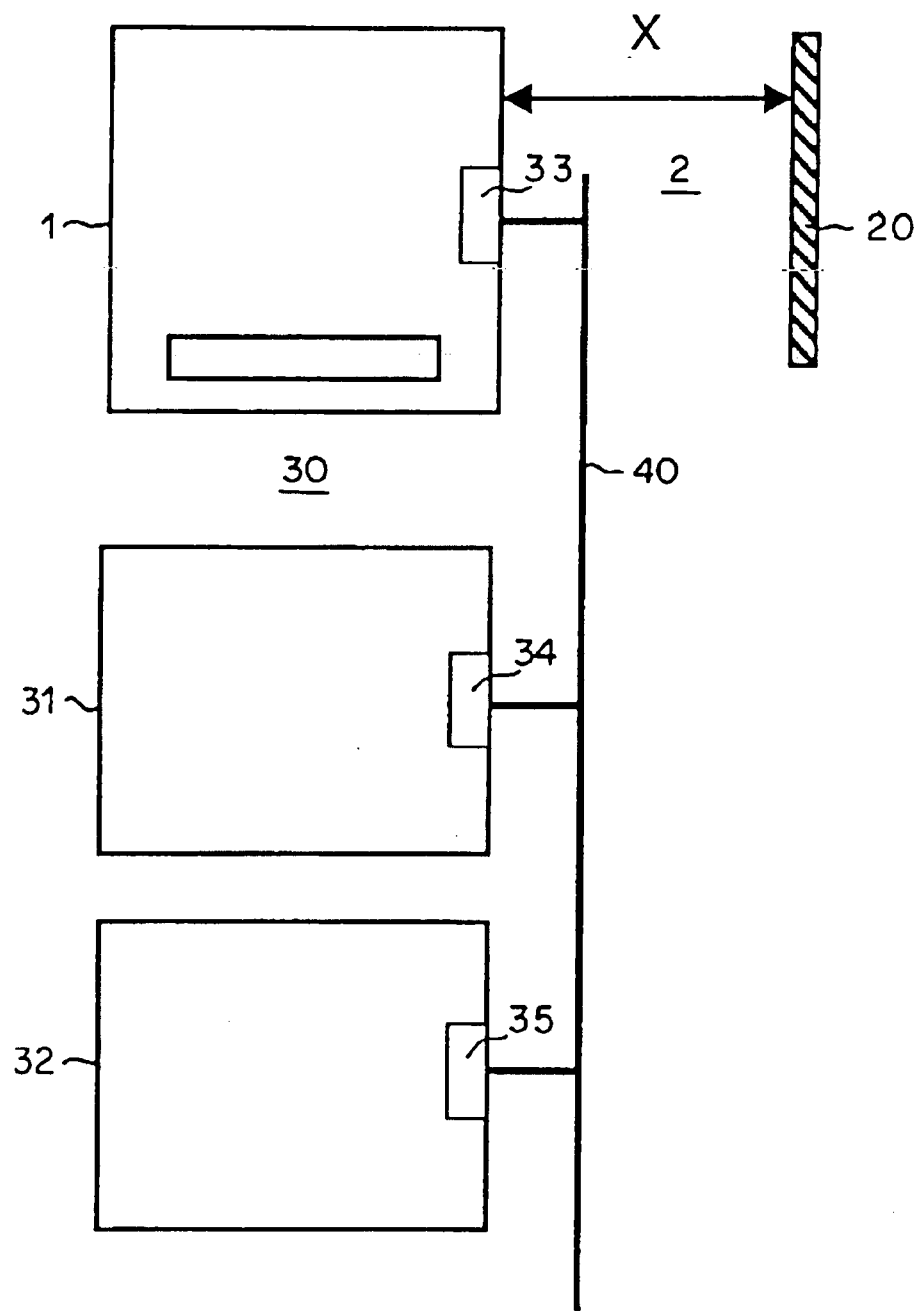
FIG. 2 shows an installation for regulating and/or controlling room climate parameters.

In FIG. 2 reference 30 denotes an installation for regulating and/or controlling room climate parameters of the room 2. The installation 30 has at least one regulating device 31, a setting member 32 and the apparatus 1 for detecting the temperature of the room 2. The regulating device 31, the setting member 32 and the apparatus 1 each have a respective interface unit 33, 34 and 35 respectively, connected to a communication medium 40. Process parameters—for example room climate values or setting signals—can be exchanged by way of the communication medium 40 between the subscriber stations, namely the apparatus 1, the regulating device 31 and the setting member 32. The communication medium 40 is a wired or a wireless connecting arrangement. FIG. 2 typically shows a part of a building management system.

It will be appreciated that the apparatus 1 and the regulating device 31 if necessary can also be embodied in a single assembly.

The basic principles regarding the propagation of sound waves are generally known, for example also from V. Sutilov, Physik des Ultraschalls ("Physics of Ultrasound"), Springerverlag, 1984. For air at a temperature of 0° C. the speed of sound co is 332 ms$^{-1}$. The speed of sound in air is dependent on the humidity and temperature.

For the further description of the mode of operation of the apparatus 1 (FIG. 1), the following symbols which in part have already been introduced above are used:

x denotes the spacing between the sound transducer 4 and the obstacle 20;

t denotes the transit time of the sound waves over the distance x;

$c_0$ denotes the speed of sound in air at a temperature of 0° C., $c_0$=331.65 m/s;

$T_L$ denotes the temperature of the air;

a denotes a first constant, a=1.75·10$^{-3}$° C.;

b denotes a second constant, b=3.35·10$^{-5}$;

H denotes the relative humidity of the air.

The speed of sound x/t can advantageously be expressed by the following equation:

$$\frac{x}{t} = c_0 \cdot (1 + a \cdot T_L) \cdot (1 + b \cdot H) \qquad \text{[equation 1]}$$

The temperature of the air is calculated from equation 1 as follows:

$$T_L = \frac{x}{t \cdot a \cdot c_0 \cdot (1 + b \cdot H)} - \frac{1}{a} \qquad \text{[equation 2]}$$

The temperature of the air can be calculated by the processor 10 in accordance with equation 2 if the transit time t of the sound waves is determined by the timer unit 5 and the relatively humidity of the air is also measured with the humidity sensor 7.

Use of equation 2 however presupposes that the spacing x is known. In actual fact upon installation of the apparatus 1 the spacing x could be accurately measured and inputted as a parameter. Such a procedure involves the disadvantage that, after changes to the geometry of the room 2, the spacing would have to be freshly measured and inputted. If the room 2 for example has partitions which are rearranged according to the current use of the room 2 manual input of the spacing x however is unreliable.

The spacing x is advantageously automatically determined by the apparatus 1. Depending on the respective geometry of the room 2 the spacing x may involve a plurality of meters up to a multiple of 10 meters.

In an advantageous method of ascertaining the spacing x a parameter is read in by the apparatus 1 and an estimation value for the spacing x is calculated therefrom. The estimation value for the spacing x is repeatedly improved in an approximation procedure.

In an advantageous embodiment of the apparatus 1 the parameter for calculating the estimation value is the room temperature T which is detected by the temperature sensor 6.

With the introduction of a function A(t,H) dependent on the transit time t of the sound waves and the relative humidity H and a third constant B it is possible to represent equation 2—or generally an equation for the temperature of the air—as follows:

$$T_L = x \cdot A(t,H) - B \qquad \text{[equation 3]}$$

or it can be resolved in relation to the spacing x:

$$x = \frac{T_L + B}{A(t, H)} \qquad \text{[equation 4]}$$

In an advantageous approximation procedure, for discrete times j, an improved estimation value for the spacing x is repeatedly ascertained and a room temperature value for the time j is afterwards calculated using the improved estimation value.

Figure 3:
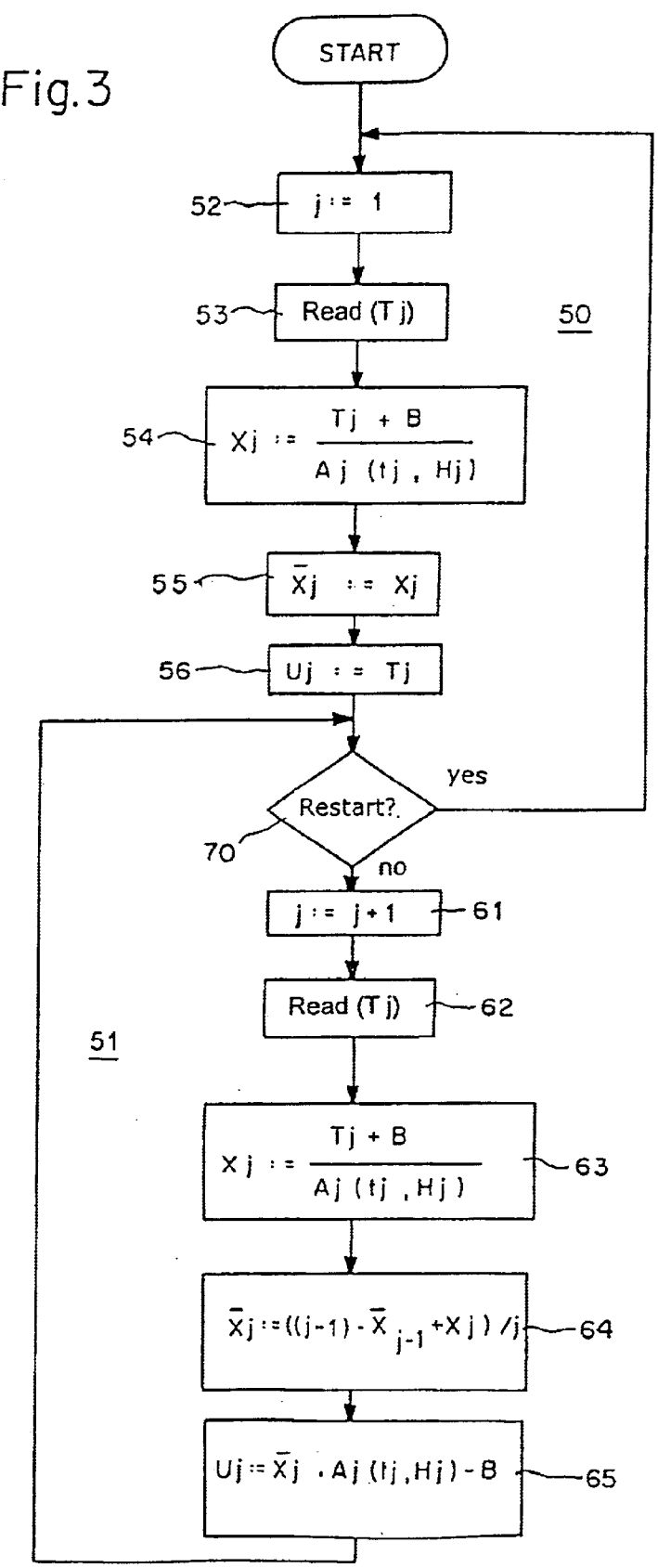
FIG. 3 shows a flow chart in relation to a method of calibrating a value for the spacing x.

In FIG. 3 reference 50 denotes an initialisation procedure by way of example and 51 denotes a calculation procedure by way of example, wherein the initialisation procedure 50, like also the calculation procedure 51, is in principle implemented repeatedly—as a loop—and executed by the processor 10. In the calculation procedure 51 on the one hand a value for the spacing x is calibrated and on the other hand a value U for the temperature of the room 2 is calculated.

In principle the calibration operation could also be broken off if the calculated values for the spacing x no longer change and the geometry of the room 2, that is to say the position of the obstacle 20, remains unchanged.

In the initialisation procedure 50, an operating variable j is set to 1 in a first initialisation step 52 for the corresponding moment in time. In a second initialisation step 53 a parameter for ascertaining a first estimation value is read in. The parameter is advantageously the room temperature $T_j$ measured by the temperature sensor 6. In a third initialisation step 54 the first estimation value $x_j$ is calculated for the spacing x on the basis of the equation 4, in which respect the room temperature $T_j$ is used in equation 4 for the air temperature $T_L$. In a fourth initialisation step 55 a mean value $\bar{x}_j$ for the estimation value $\bar{x}_j$ is advantageously initialised with the first estimation value $x_j$ itself. The mean value $\bar{x}_j$ is advantageously stored in the first storage location 8 (FIG. 1). Finally, in a fifth initialisation step 56, a variable $U_j$ is initialised with the room temperature $T_j$. The variable $U_j$ is the second memory location 9 (FIG. 1) for the temperature of the room 2, which is ascertained by means of sound waves.

In the calculation procedure 51, in a first loop step 61 the operating variable j is updated, in which case the variable j is normally increased by one. In a second loop step 62 the parameter for ascertaining an estimation value is advantageously read in again. By way of example the parameter is the room temperature $T_j$ measured by the temperature sensor 6 at the time j. In a third loop step 63 the estimation value $x_j$ for the spacing x is freshly calculated using equation 4, in which case the measured room temperature $T_j$ is advantageously used for the air temperature $T_L$ in equation 4.

In a fourth loop step 64 the mean value $\bar{x}_j$ is improved, in which case by way of example the mean value $\bar{x}_j$ is freshly calculated from the preceding mean value $\bar{x}_{j-1}$ and the current estimation value $\bar{x}_j$, by forming the arithmetic mean. It will be appreciated that in certain cases a fresh mean value can advantageously be formed in another fashion, for example by forming the geometrical mean or by disregarding greatly differing values.

The mean value formation operation proposed in FIG. 3 in accordance with the formula:

$$\bar{x}_j := ((j-1) \cdot \bar{x}_{j-1} + x_j)/j \qquad \text{[formula 5]}$$

is particularly simple as in each case only a single previously calculated mean value $\bar{x}_{j-1}$ has to be available in the memory.

Finally in a fifth loop step 65 the value of the variable $U_j$ is updated, advantageously using equation 3. With the variable $U_j$ instead of $T_L$ and the mean value $\bar{x}_j$ instead of the spacing x, that gives the fifth loop step 65, from equation 3, with:

$$U_j := \bar{x}_j \cdot A_j(t_j, H_j) - B \qquad \text{[formula 6]}$$

At the conclusion of the calculation procedure 51—or at the beginning—a test 70 is advantageously implemented to ascertain whether the initialisation procedure 50 is to be executed afresh or whether the calculation procedure 51 is to be repeated.

The initialisation procedure 50 is advantageously implemented if the value of the variable x unexpectedly abruptly changes.

The temperature of the room 2, which is ascertained by means of sound waves and stored in the variable U, is an average room temperature. By virtue of the fact that temperature-dependent propagation of the sound waves in the room 2 is utilised to measure the room temperature, a temperature value U is available, which is ideal as the actual value for regulating and/or controlling room climate parameters. By appropriate placement of the apparatus 1 in the room 2 in such a way that a path with the spacing x leads through a region of the room 2 which is relevant in terms of determining temperature, it is possible to achieve an improved level of comfort in the room. In contrast thereto a temperature sensor in the form of a nickel resistor or a thermoelectric element only ever supplies the temperature of a point in the room which in addition is thermally more or less coupled to the wall on which the temperature sensor is arranged.

It will be appreciated that the frequency of the sound waves used is selected to be in the range of ultrasound if the room 2 is a room for living or working in.

The frequency of the sound waves which can be used in a practical context is limited downwardly at about 40 kHz as at lower frequencies the first harmonics f/2 fall into the audible range. Upwardly the limit is at about 80 kHz as at higher frequencies absorption by the air has an excessive effect. At a sound frequency in the range of 40 kHz to 60 kHz the spacing x which can be covered is also sufficient for a relatively large room 2.

I claim:

1. Apparatus for detecting the temperature of a room including:
   means for generating and receiving sound waves,
   means for determining the transit time of the sound waves for a certain distance in the room,
   a humidity sensor and a temperature sensor with which a temperature and
   a humidity is detected for calculating a first estimation value of the distance, means for automatically carrying out an approximation procedure for improving the first estimation value to ascertain the distance, and
   means for calculating the temperature of the room from the ascertained distance, the determined transit time, and the detected humidity.

2. An apparatus according to claim 1, wherein a first mean value of the first estimation value is calculated, a second estimation value of the distance is calculated, and the approximation procedure improves the first estimation value by repeatedly calculating a new mean value based on the first mean value and the second estimation value.

3. An installation for regulating and/or controlling room climate parameters including an apparatus according to claim 1.

4. A method of detecting the temperature of a room by means of sound waves including the method steps of:
   emitting sound waves towards a delimiting surface of the room, which reflects sound waves;
   receiving reflected sound waves;
   determining the transit time of the sound waves,
   detecting a humidity of the room,
   estimating a value of the spacing at which the delimiting surface is from a device that emits or receives the sound waves,
   calibrating the estimated value, and
   calculating the temperature of the room using the calibrated estimated value, the transit time, and the detected humidity.

\* \* \* \* \*